US011232638B1

(12) United States Patent
French

(10) Patent No.: US 11,232,638 B1
(45) Date of Patent: Jan. 25, 2022

(54) SYSTEM AND METHOD FOR CREATING LINKS TO SUPERIMPOSABLE DIGITAL MEDIA CONTENT MESSAGES VIEWABLE ON AN ELECTRONIC DEVICE

(71) Applicant: Bradley French, Fairborn, OH (US)

(72) Inventor: Bradley French, Fairborn, OH (US)

( * ) Notice: Subject to any disclaimer, the term of this patent is extended or adjusted under 35 U.S.C. 154(b) by 58 days.

(21) Appl. No.: 16/878,811

(22) Filed: May 20, 2020

(51) Int. Cl.
*G06T 19/00* (2011.01)
*G06T 7/73* (2017.01)
*G06T 7/60* (2017.01)
*G06K 7/14* (2006.01)
*G06F 16/58* (2019.01)
*G06K 9/62* (2006.01)

(52) U.S. Cl.
CPC ............ *G06T 19/006* (2013.01); *G06F 16/58* (2019.01); *G06K 7/1413* (2013.01); *G06K 7/1417* (2013.01); *G06K 9/6201* (2013.01); *G06T 7/60* (2013.01); *G06T 7/73* (2017.01); *G06T 2200/24* (2013.01)

(58) Field of Classification Search
None
See application file for complete search history.

(56) References Cited

U.S. PATENT DOCUMENTS

| | | | |
|---|---|---|---|
| 9,280,849 B2 | 3/2016 | Adhikari et al. | |
| 9,498,694 B2 | 11/2016 | Huston et al. | |
| 9,818,150 B2 | 11/2017 | Rhoads et al. | |
| 9,824,436 B2 | 11/2017 | Persely | |
| 9,965,471 B2 | 5/2018 | Huston et al. | |
| 10,043,238 B2 | 8/2018 | Bean et al. | |
| 10,080,066 B2 | 9/2018 | Rao et al. | |
| 10,096,161 B2 | 10/2018 | Callaghan | |
| 10,127,724 B2 | 11/2018 | Carre et al. | |
| 10,157,502 B2 | 12/2018 | Montgomerie et al. | |
| 10,169,924 B2 | 1/2019 | Rosenthal et al. | |
| 2012/0327117 A1 | 12/2012 | Weller et al. | |
| 2013/0183021 A1* | 7/2013 | Osman | G07F 17/3216 386/239 |
| 2014/0164921 A1 | 6/2014 | Salinas | |
| 2014/0279246 A1* | 9/2014 | Chen | G06F 16/58 705/26.61 |

(Continued)

OTHER PUBLICATIONS

"QR Code Generator" found at https://www.qrstuff.com/ discloses a tool for creating QR codes of linked videos. The QR codes can then be printed on stickers by a number of vendors or with a printer.

(Continued)

*Primary Examiner* — Saptarshi Mazumder
(74) *Attorney, Agent, or Firm* — John Rizvi; John Rizvi, PA—The Patent Professor®

(57) ABSTRACT

A system and method for creating links to superimposable digital media content messages that are viewable on one or more electronic devices. The system provides a unique experience to a user to send digital media messages to another user electronically, where the message is accessible by scanning a tangible, and in some instances liftable, objects. The digital message may comprise at least one image and/or video that is superimposable on a real-world environment when seen through the display of one or more electronic devices, giving the user watching the message a unique and one of a kind experience.

20 Claims, 7 Drawing Sheets

(56) References Cited

U.S. PATENT DOCUMENTS

| | | | |
|---|---|---|---|
| 2016/0093106 A1* | 3/2016 | Black | G06K 9/00624 |
| | | | 345/633 |
| 2018/0053021 A1 | 2/2018 | Rasheed | |
| 2019/0012442 A1* | 1/2019 | Hunegnaw | G06K 9/00228 |
| 2020/0117321 A1* | 4/2020 | Phillips | G06K 19/06037 |
| 2020/0374498 A1* | 11/2020 | Sodhi | G03B 21/2046 |

OTHER PUBLICATIONS

"QR Code Stickers" found at https://www.carstickers.com discloses a custom QR code printed on a sticker.

* cited by examiner

SYSTEM AND METHOD FOR CREATING LINKS TO SUPERIMPOSABLE DIGITAL MEDIA CONTENT MESSAGES VIEWABLE ON AN ELECTRONIC DEVICE

FIELD OF THE INVENTION

The present invention relates generally to augmented reality digital media messaging and more particularly, to a system and method for creating links to digital messages sent to persons through tangible, detectable objects, where the digital messages comprise superimposable digital imagery on real-world environments when seen through the display of one or more electronic devices.

BACKGROUND OF THE INVENTION

Psychologists, philosophers, biologists, and sociologists disagree on many principles governing human life, ranging from the most basic theories to the more complex ones. However, one of the few nodes of agreement reside on the belief that human beings have a strong and deep desire for belonging. In other words, being accepted into social groups and forming positive, enduring relationships with others. Psychologists, in particular, believe that this is not merely a desire, but a need, and that humans must form these meaningful relationships. According to psychologist Baumeister's "Need-to-belong Theory" research from 2012, this need is one of the most powerful, universal, and influential human drives, shaping emotion, cognition, and behavior.

When the fulfillment of this need is not achieved by the individual, and they perceive a gap between their desire for social connection and its realization, the psychological effect resembles a state of distress felt by all at some point in their lives—loneliness. Our failure to connect with other individuals, to form lasting, meaningful relationships, may propel us toward the development of mental health disorder, which may interfere with daily activities and prove difficult to recover from. Historical levels of loneliness have not been drastically low, especially in times of disaster and uncertainty, such as World War I and II, the Great Depression, and other world altering events. Since the Digital Revolution, however, when mechanical technology transitioned into digital electronics, the rate of loneliness has skyrocketed. According to a 2017 Harvard Business Review article, the rates of loneliness had doubled since the 1980s, and its author share a similar sentiment with Baumeister, that loneliness is a growing health epidemic.

Comprehension of this seeming inexplicable trend requires a deeper dive into the electronics that made readily available to individuals, and how electronics have been utilized since. One might argue, with reason, that the advent of cellphones, and later smartphones, allowed individuals from around the world to communicate instantly with whom they desired. This is the first time in which humans trespassed the distance barrier and became effectively global citizens. Logically, this should have plummeted the number of individuals feeling lonely, as they could now conveniently pursue company by reaching for their cellphones. Surprisingly, the exact opposite transpired—loneliness expanded uncontrollably.

Extensive agreement exists on the reasons behind this trend, one of them being the growing superficiality of relationships. As mentioned earlier, not only do humans need to form relationships, these relationships need to be meaningful and enduring, something that is difficult to establish using technology. Further, social cues gathered from observation of body language is extremely difficult to convey and understand through a cellphone, even when viewing the other person through video, as most of the time their body is hidden from view and only the face is visible. This will interfere with our ability to navigate a conversation based on the nonverbal communication of the individual we are engaging with.

Smartphones have perpetuated this issue by not only serving as a primary means of communication between long-distance individuals, but also granting the power to carry most of one's life within it, making us more and more dependent on the screen and less dependent on face-to-face interactions. Multiple studies have been conducted on the impact smartphones on mental health, all reaching the conclusion that the isolation created by the use of smartphones has had a negative impact on the mental health of its users. Sociologist Sherry Turkle calls it the "alone together phenomenon," implying that the only sense of togetherness smartphone users feel is the shared feeling of loneliness.

Ways to combat this widespread feeling have become available, but it is up to the user of the technology to make the necessary change. One idea is to simply quit using smartphones. This is clearly not practical, as they have integrated into our lives in an astounding number of ways, such as serving as our GPS, lending us instant access to internet browsers, contacts, and emails, along with other important aspects of our lives. The other approach, and the more sensible one, is to create certain features that allow smartphones to feel more personal, and make users feel less alone despite still benefiting from its useful characteristics.

Examples of how this has been attempted include the option to send photos to someone through a chat feature. For example, if you are unable to make it to someone's birthday because of a health issue, your friend may send you a photo of the guests and the party. Although it is certainly better than receiving a message saying "the party was great," it fails to provide you with a sense of shared experience. It merely gives you a glimpse of what you have missed, possibly making you feel even lonelier. The next best option is to create a video and share it. This provides a better awareness of setting and permits a more immersive experience by attracting your auditory, and not just visual, sense. The limitation with this technology is that it still feels superficial and bland, and it is not appropriate nor practical for a number of other situations. Therefore, for the feeling of loneliness to dwindle, a technology that allows the smartphone to present the user with more personal and lifelike interactions in all corners of the world must be employed.

Accordingly, there is an established need for a system and method that allows an individual to send a tangible and at the same time electronic, personalized message that feels real, intimate and/or provide a more immersive experience that would solve all of the underlying issue that remain.

SUMMARY OF THE INVENTION

The present invention is directed to a system and method for creating links to digital messages sent to persons through tangible, detectable objects, where the digital messages comprise superimposable digital imagery on real-world environments when seen through the display of one or more electronic devices.

Introducing a first embodiment of the invention, the present invention consists of an augmented reality system for creating superimposable digital media content messages viewable on electronic devices, comprising:

a digital platform stored in a computer-readable memory and executed by at least one processor on at least one server in electrical communication with an object identifier database, a digital media content database, a link creating subsystem, a value assigning subsystem, and a value identifier subsystem, allowing the augmented reality system to:

receive a first user's request to access an embedded electronic camera on an electronic device to capture a digital image of an object having at least one object feature;

assign at least one value to the object feature of the object captured in the digital image;

create a protected link that is only accessible via a key and embed the protected link in the digital image, wherein the protected link is a hidden link:

store the digital image of the object with the embedded protected link in the object identifier database;

process the first user's request to store digital content in the digital media content database and connect the digital content to the protected link in the digital image so that the digital content is accessible through the protected link;

receive a second user's request to scan the object with an embedded electronic camera on an electronic device;

process a scanned digital image of the object stored in memory taken by the second user, wherein an identifier value subsystem determines whether a value match exists in the object identifier database;

if the matched value is found, access the link embedded in the digital image having the key give access to the digital content connected to the protected link; and show on a display of the electronic device of the second user the digital content.

In another aspect, the digital media content may comprise at least one digital image.

In another aspect, the digital media content may comprise at least one digital video.

In another aspect, the value identifier subsystem assigns the value to the object feature of the object captured in the digital image.

In another aspect, the key to access the protected link is may comprise the assigned value.

In another aspect, the value assigning subsystem may assign a plurality of values to a plurality of features of a single object.

In another aspect, the object feature of the object may comprise object's geometric shape.

In another aspect, the object feature of the object may comprise a scannable code.

In yet another aspect, the object feature of the object may comprise an NFC sticker.

In another aspect, the digital media content may comprise digital media that is superimposable on a real-world environment when seen through the display of the electronic device.

In yet another aspect, the least one digital image or digital video may comprise a three-dimensional image or video of at least one person that is superimposable on a real-world environment when viewing the digital image through the display of the electronic device.

In another aspect, the object is a tangible object.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown through the figures, the present disclosure is directed toward a downloadable digital platform that allows a person to create a link, and connect the link to digital media content and store the digital media content in a database on a server. The link is protected from being accessed by anyone, and can only be opened with a key. In one particular embodiment, the key is an object with unique distinguishable features that when scanned and identified as the key, the media content connected to link begins to play on an electronic device. The media content in one exemplary from may be provided as superimposable images and/or videos on a real-world environment when seen through the display of one or more electronic devices.

Figure 1:
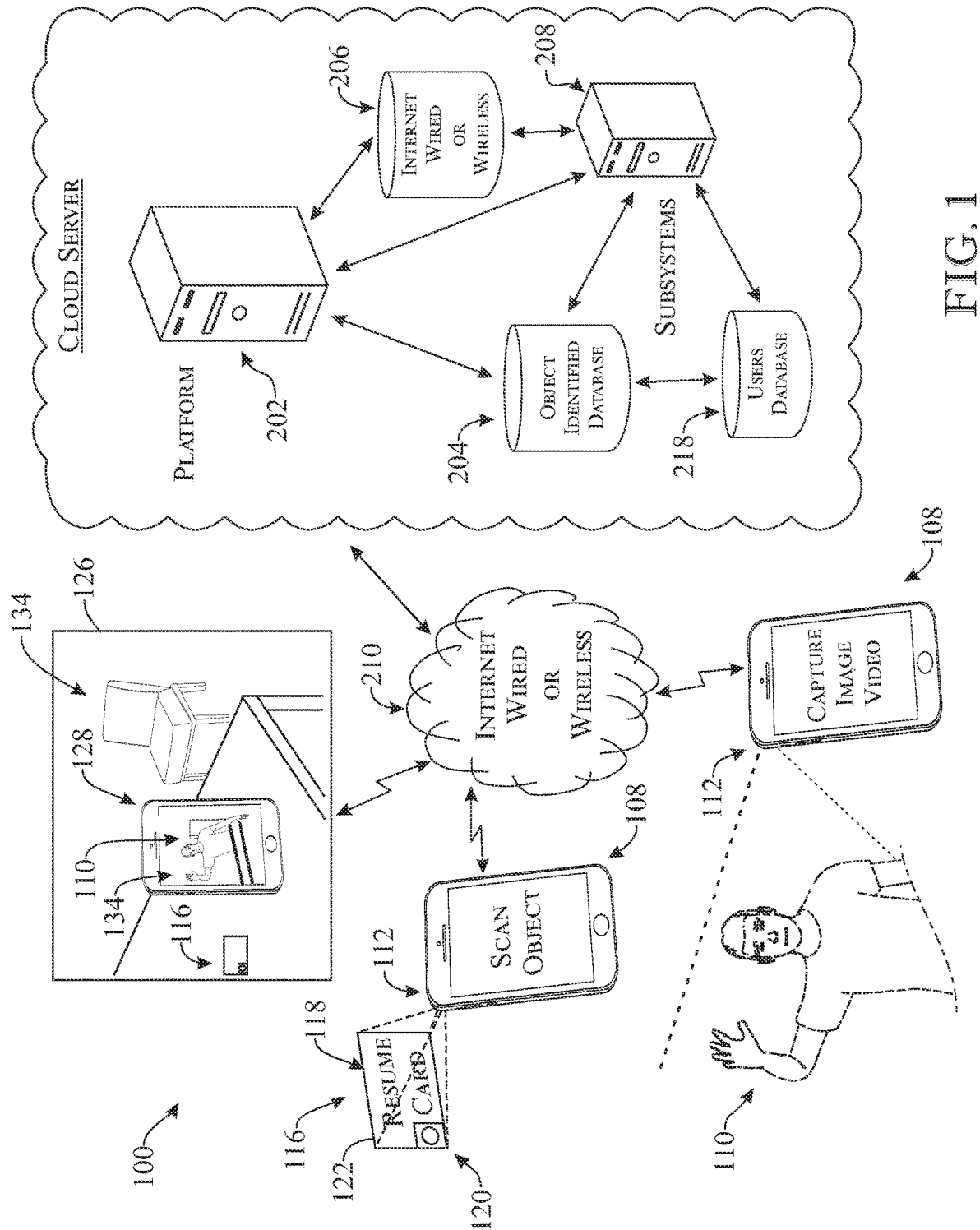
FIG. 1 presents a schematic view of an augmented reality system for creating superimposable digital media content that is viewable on an electronic device of the present invention.
Figure 3:
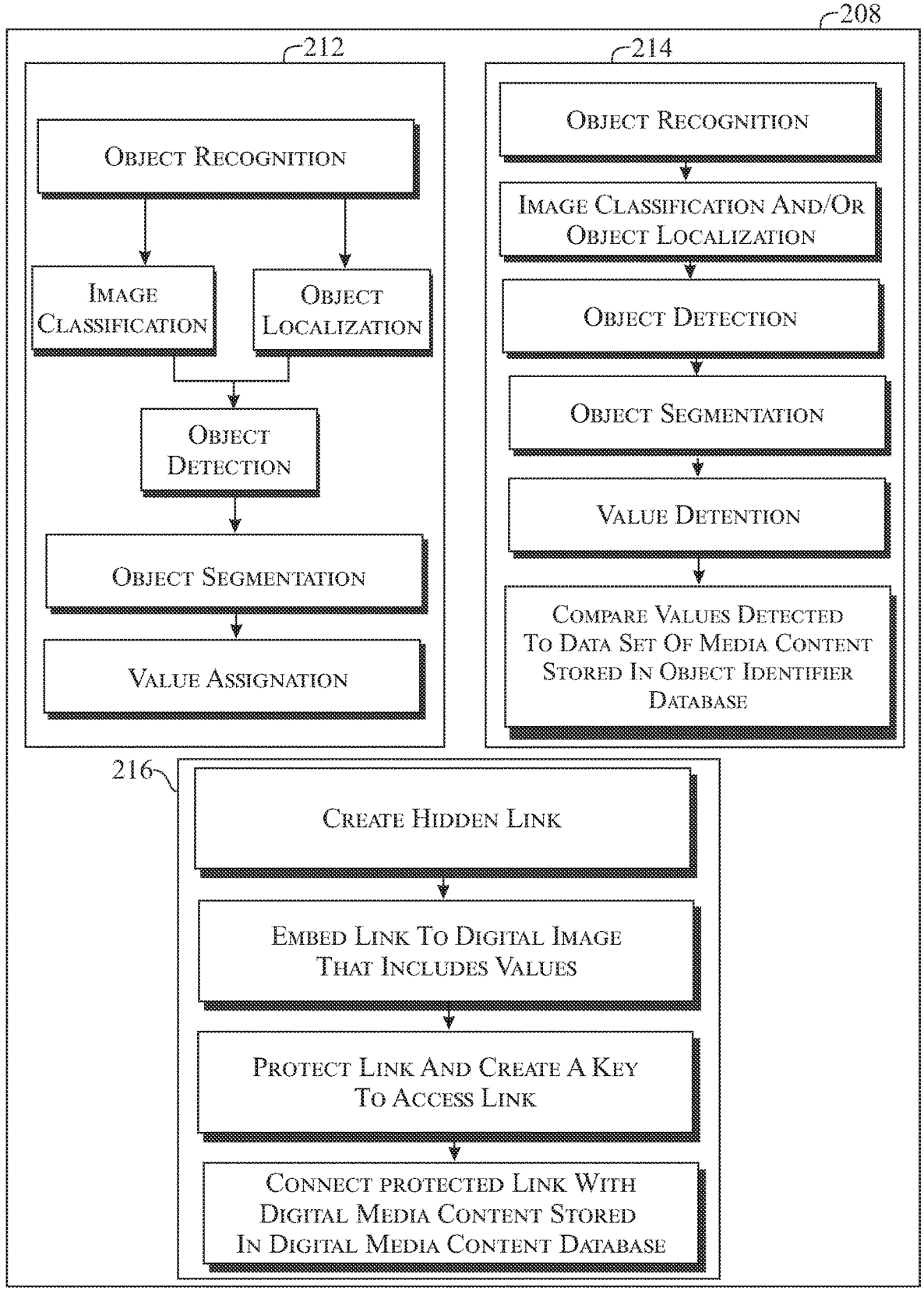
FIG. 3 presents a flow chart of the subsystem of the present invention work in unison to assign values to a unique feature/structure of an object on a digital image, assign and embed a link to that digital image with the unique feature/structure, and identify the unique feature/structure on the digital image to access the embedded link.

Referring initially to FIGS. 1 and 3, there is shown a schematic view of an augmented reality system [hereinafter "system"] 100, showing at least one electronic device 108 in electrical communication with a digital platform 202 hosted on a cloud-based system 200 that receives requests to download the augmented reality application, applicant named "Mediar." The cloud services system 200 also shows an object identifier database 204, a digital media content database 206, and a plurality of subsystem 208 in electrical communication with the digital platform 202, and each respective unit. The cloud-based system 200 and all of its units (i.e., databases and subsystem) are in electrical communication, and accessible via a communication network 210. The at least one electronic device 108 may generally comprise a handheld, portable mobile or smart phone device, tablet, lap top computer or work station and may include audio and video circuitry, a keyboard (physical or digital) or touchpad, memory or access to memory, one or more processors, I/O network interface, application program interface, read/write memory (RAM), read-only memory (ROM), and a visual screen or display for navigation through the Mediar app.

Electronic device 108 utilized to operate the Mediar app and connect to the cloud-based system 200, hosting the digital platform 202, electrically communicates via wired (land line), wireless, or internet communication network 210, including VIOP (voice over internet protocol) network. Communication network 210 may include wireless communication including but not limited to: WLAN (wireless local area network, Wi-Fi, (IEEE 802.011), WPANS (wireless personal area networks, such as Bluetooth (IEEE 802.15), Infrared, ZigBee, WMAN (wireless metropolitan area network, such as WiMax (IEEE 802.16)), WWAN (wireless wide area networks, internet), and GAN (global area network), a mobile wireless communication system, such as 3G, 4G, or 5G, and an internet protocol based communication system. The communication network 210 may also include a wired communication including but not limited to, fiber optic systems, a telephone network such as a PSTN (public standard telephone network). The communication network 210 may further include a radio frequency network (RF), a cable network, a satellite network, and an internet or intranet network, where each network is adapted for transmitting, and receiving data, information, audio, video, texts, messages, emails, and files from the electronic device 108, and cloud services system 200. It will be noted that network, interface, communication and information exchange equipment, components or peripherals may be employed, including, but not limited to, use of base stations, servers, routers, switches, repeaters, towers, antennas, Ethernet hubs, wired or wireless data pathways, modems, virtual private networks (VPN), modems, proxy servers, application program interfaces (APIs), networking adapters, or gateways. Encryption protocols may also be employed to secure the transmitted information, data, or messages. For example, a few exemplary forms of encryption include IPsec, or secure sockets layer (SSL), and symmetric or asymmetric encryption.

The cloud services system 200 includes at least one cloud-base server that may comprise one or more servers, computers, I/O and/or network interfaces, processors, memory, and necessary computer readable medium for storing, processing, operating, sharing, transferring, and receiving, data, files, videos, images, audio, and other information, and for performing computations, hosting web pages and/or applications, maintaining and communicating with databases, processing software application source cloud, and other operatives associated with software functionalities. In one exemplary embodiment, the one or more cloud-based servers may include an application server, a web server, a computing server, a communications server, a database or file server, a mail server, a proxy server, or additional servers. The cloud-based server can be managed, controlled and operated by a designated internet service provider, dedicated management, or third party. As such the server 112 may be managed by any of an application service provider (ASP) offering on-demand software or software as a service, a network service provider (NSP), an internet service provider (ISP), a managed service provider (MSP), or a telecommunication service provider (TSP) where providers can charge an ongoing subscription or fixed fee service to users. The server memory may comprise any suitable memory technology, such as static random access memory (SRAM), synchronous dynamic RAM (SDRAM), nonvolatile/flash-type memory, or any other type of memory. Machine-executable program instructions or computer application programs associated with the augmented reality software platform may be stored on one or more machine readable mediums, including but not limited to, optical disk, magnetic or optical card or tape, flash memory, CD/DVD-ROM, memory dongle, magnetic media such as a hard drive or any other external machine-readable medium coupled to server or server computer via, I/O interface. Computer-accessible medium may include any volatile or non-volatile media such as RAM (e.g. SDRAM, DDR SDRAM, RDRAM, SRAM, etc.), ROM, EEPROM, or EPROM.

With continued reference to FIGS. 1 and 3, the object database 204, subsystems 208, and the digital media content database 206 are in electrical communication with the cloud services system 200 and digital platform 202, and includes, or has accessible communication or storage capacity with, internal or external storage comprising optical disks, CD-ROM, flash memory or USB storage devices, or other machine readable medium suitable for storing computer source code. File manifests, index manifest, instructions, identifier values, data tables, look-up tables, files, data, information, or folders. It is appreciated that the digital platform 202, databases 204, 206 and any one subsystem 208 may be entirely included within, and made part of, the cloud services system 200. Alternatively, the databases 204, 206 and subsystems 208 may be maintained in one or more separate physical or geographic locations from the cloud services system 200. In one exemplary embodiment, the subsystems 208 may comprise a value assigning subsystem 212, a value identifier subsystem 214, and a link creating subsystem 216.

Referring now in particular to FIG. 3, the value assigning subsystem 212, in one exemplary form, may include an object recognition (or detection) hardware and software for identifying objects in images or videos utilizing machine learning and deep learning tools. The value assigning subsystem is designed to perform classification tasks directly from digital media content, such as digital images, to find and distinguish natural features or intrinsic structures in objects and assign values to those features and/or structures to create a digital media file with identifiable values. For example, the system performs several tasks to identify an object and its unique features and/or structures, which includes classifying the image type in the digital image or localizing the object in the digital image. Image classification may involve assigning a class label to an image, whereas localization involves drawing a bounding perimeter around one or more objects in an image. The present invention may combine both tasks of localization and classification to provide higher accuracy in object detection.

After the object is detected, the system segments the object. Meaning, specific pixels of the digital image of the objected are recognized to identify unique structural or visual features. Identifiable structural features may include, but are not limited to, the geometric shape of the object, outline (perimeter) shapes of the object, and/or coding of some sort (e.g., QRC coding, bar coding, or the like). Identifiable visual features may include, but are not limited to, a wide variety of colors or shades of colors (including black). In yet an alternative embodiment, identifiable features may include NFC chips or stickers that are attached to the object. Unique and unrepeatable values are assigned to those specific pixels that identify unique structural and/or visual features. It is appreciated that the value assigning subsystem performs constant routine audit checks to ensure that an assigned value to a specified feature or structure of an object is not repeated and/or assigned to two different objects. The digital image having now identifiable values is storable in the object identifier database 204. Storage of the image in the object identifier database 204 may be indefinitely, or removed after a prescribed period.

The value identifier subsystem 214 of the present invention comprises software and components of hardware configured to perform object detection and value detection in a digital images. Similar to the value assigning subsystem 212, the value identifier subsystem 214 is designed to perform classification tasks from digital images to find and distinguish natural features or intrinsic structures in objects. Moreover, the subsystem 214 is configured to recognize, if any, values assigned to the features and/or structures detected in the digital image, and compare the detected values to a dataset of images with values stored in the object database 204 to find a match. For example, the value identifier subsystem 214 performs the task of identifying the object in the digital image and pinpoint the object's unique features and/or structures. Image classification and image localization is used to detect the object. The subsystem then segments the object to identify unique structural or visual features. Alternatively, the image may be segmented to identify a code of some kind, for instance, a bar code or QRC. In yet another alternative embodiment, the user 110 can use the electronic device running the application to scan an NFC sticker attached to the object.

Following the identification of the detected object's unique structural or visual features, the value identifier subsystem 214 compares the identified features to the dataset of images stored in the object database 204 for images with detected objects and assigned values for a match. Where an NFC sticker is scanned, the subsystem will quickly identify which digital image matches the scanned sticker. Where a digital image is being scanned for identifiable features, it is appreciated that the value identifier subsystem 214 is calibrated to recognize or detect minute differences between objects that the human eye would not be able to distinguish. The advancement of the high definition resolution of digital images, which can range up to 3840× 2160 pixels (4K) to about 7680×4320 pixels (8K), permits highly accurate segmentation of the digital image.

Figure 2:
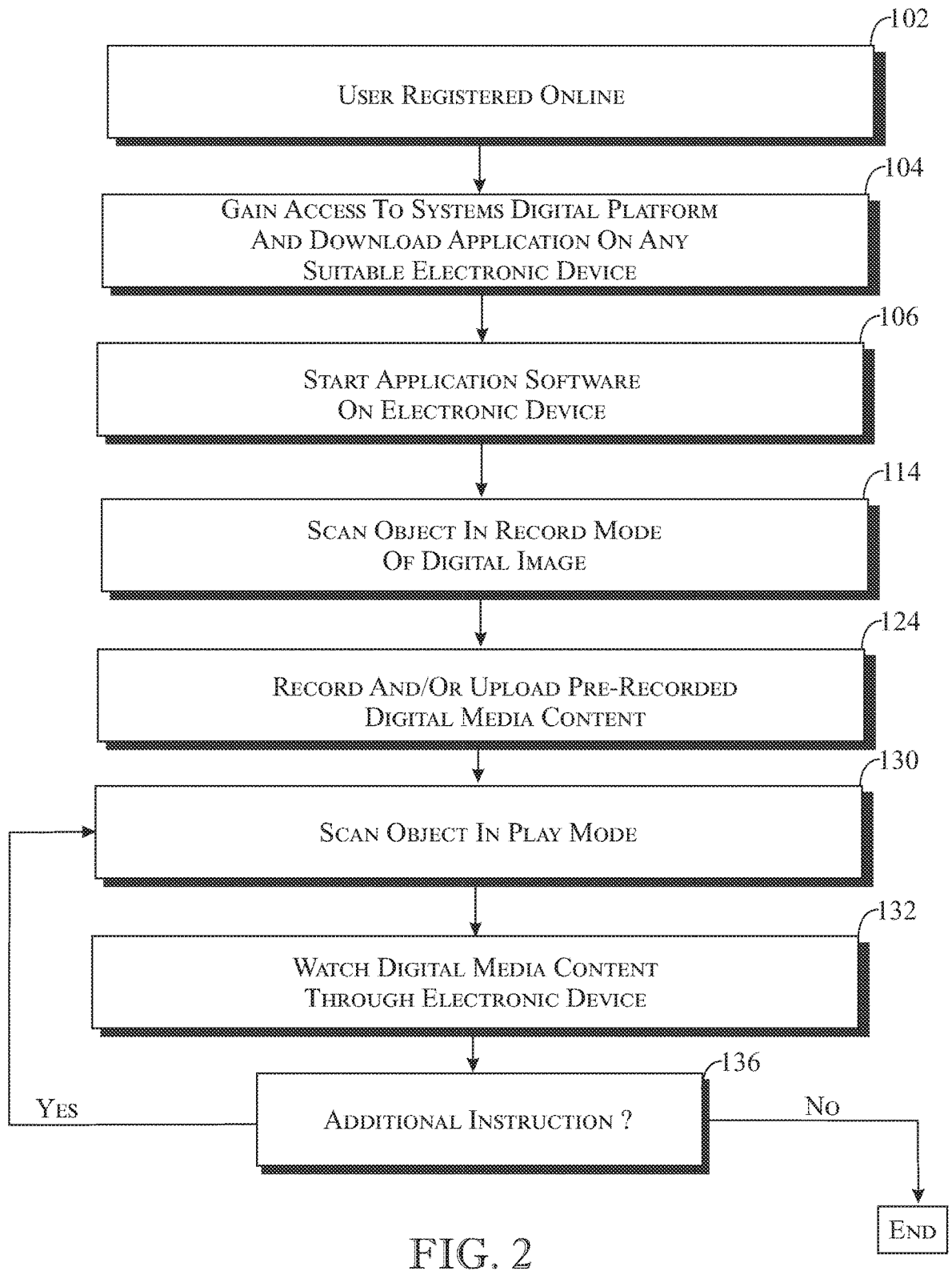
FIG. 2 presents a flow chart of how to create and access the superimposable digital media content through a digital platform supported by the augmented reality system of the present invention.

With reference to FIGS. 1-3, one example is presently shown illustrating how a person 110 may gain access the system 100 and use the app, Mediar, to send a message. With specific reference to FIGS. 1 and 2, a person may set-up a user-account by registering online with the digital platform 202 hosted on the cloud services system 200. The registration process 102 may solicit users to pay associated membership fees, if any, to create a user profile. Alternatively, the registration process may or may not solicit a one-time payment to download the application by initiating a request to the digital platform 202 hosted on the cloud service system 200, as denoted in step 104. Upon given authenticated access, users are free to create and upload digital images, and informational content about themselves to their respective profile. User profile accounts and their information are stored in the user database 218, which is in communication with other databases and subsystems that are part of the cloud service system 200.

Following the user registration process and upon gaining authenticated access to the digital platform, users may access the application on an electronic device 108 as is denoted in step 106. As mentioned above, an electronic device 108 may generally comprise a handheld, portable mobile or smart phone device, tablet, lap top computer or work station that includes an embedded (or external and portable) camera 112. After accessing the application, a user can select record/create mode to take a digital image of an object and begin the general steps to prepare and send a message. For example, as is illustrated in FIG. 1, a user 110 may use an electronic device 108, such as a smartphone with an embedded camera 112, to take a digital image of an object 116. During this process, the value assigning subsystem 212 is actively running to detect the object 116 in the digital image that was taken with the electronic device 108. As described above, the value assigning subsystem 212 detects features and/or structures that are unique to the object 116. In this example, the subsystem may recognize the text 118 on the object 116, an NFC sticker 120 attached to the object 116, and/or the geometric shape 122 of the object 116. It is appreciated that the features described here are considered exemplary and thus, should not be considered to be limiting. Upon detecting an identifiable feature(s), the value assigning subsystem assigns values to those features and stores the digital image with the assigned values in the object identifier database 204. The object database 204 includes directories or indexes of digital images with assigned values, and is in communication with one or more electronic devices 108, via, cloud-based system 200, via, network 210.

With continued reference to FIGS. 1-3, and in particular FIG. 3, the link creating subsystem 216 of the cloud services system 200 creates a hidden link that is assignable to the digital image when the user 110 is in record mode 114 and taking a digital image of the object 116 to be used as the prompt for the digital message. The link creating subsystem 216 assigns a protected (hidden) link to the digital image that has already been processed by the value assigning subsystem 212. One will appreciate that a hidden link, is a link that is not visible to a user 100 but accessible if the link is activated at some point in the code where it is required. The link creating subsystem 216 also assigns a key to the protected link, which in one exemplary form is the assigned values to NFC sticker, or identifiable feature of the object

116. Put differently, to access the hidden link assigned to the digital image that includes the assigned values in the object identifier database, a user 110 must provide the identical set of structural and or visual/textual features, or the NFC sticker (i.e., the key) to access the link.

Turning now to FIGS. 1, 2 and 3, illustrates that a user 110 has the ability to create a user-customized audio, video, and/or digital media content file 124. For example, as is best illustrated in FIG. 1, a user may use the embedded camera 112 on the electronic device 108 to capture an image or a video of their choosing. The application supports augmented reality programming that allows a user 100 to capture an image or video that is viewable through the display screen of the electronic display in three-dimensional space (i.e., real-world environment). In the illustrated example of FIG. 1, the user 100 creates one or more video messages about himself and his work experience instead of putting his work experience on a sheet of paper (i.e., a resume). The digital video is then stored in the cloud services system's digital media content database 206. In an alternative exemplary embodiment, the user 100 may upload a pre-recorded video or montage of digital video files and save the digital videos in the database 206. The protected link that was created when the user 110 was in record mode is connected or otherwise linked to the digital video that was saved in the digital media content database 206. Meaning, the digital video the user 100 recorded (or uploaded) is now accessible via the hidden link that is embedded to the digital image that was taken of the object 114 denoted in step 114.

The tangible object 116, which in this example is a business card, can be subsequently mailed, handed, or otherwise given to another person to provide a unique experience of how to send messages, images, and or videos to another person. For example, as shown in FIG. 1, the user 100 may send the object 116 (i.e., business card) containing (in this exemplary embodiment) a video message outlining the user's work experience to a prospective employer 126. The employer 126 may use an electronic device 128 to take a digital image of the object 116 and scan it. There are generally two methods described herein that would facilitate how the employer 126 may gain access the digital video message and thus, they should be considered exemplary and not limiting.

In a first exemplary method, the object may include language or instructions requesting the employer to download the application (i.e., Mediar) and follow the on-screen instructions of setting up a user profile as described heretofore. Alternatively, the object 116 may include a code, such as a QRC code (or bar code), or chip, such as an NFC sticker chip, that when scanned with an embedded camera on an electronic device automatically directs the employer 126 to an app store to download the application that would give the employer 136 access to the video message. One will appreciate that the present application is supported in both Android® and Apple® platforms. Regardless of which method is employed, once the employer 126 gains authenticated access to the digital platform 202 of the cloud service system 200 through the application, the employer 126 may activate scan mode in the application menu as denoted in step 130. When in scan mode, the employer 126 holds the electronic device 128 and utilizes the device's embedded camera to take an image of the object 116, which is retained in the devices memory.

Scan mode automatically activates the system's value identifier subsystem 214, which is designed to detect the object 116 in the image stored in the devices memory, segment the object, and detect values (if any), and compare its findings with the data set of images and values stored in the object identifier database 206. Alternatively, the value identifier subsystem 214 may recognize any bar codes or NFC stickers that function as identifiable values and look for a match to those values in the data set of images stored in the object database 206. If the subsystem determines the scanned values match any of the saved values of an image file in the object database 206, the hidden link embedded in the saved digital image file automatically connects to the appropriate digital media content file, or in this case the digital video that is associated with the link (as described above for this example). The video may automatically play or the employer 126 may select the play function on the app and watch the video image taken of the user 110 superimposed on the real-world environment surrounding the employer 126 as the employer views the video message through the display screen of the electronic device 128. Put differently, the employer 126 can watch a simulation of the user 110 (or in this example the potential employee) superimposed on the real-world environment 134 of the employer's 126 surrounding (i.e., the user 110 standing in front of the employer's desk) when viewing the video through the electronic device 128. Depending on how the user 110 sets up the message, the user can program or request that additional action be taken (i.e., scanning another object), as denoted in step 136. If additional instructions are given, the employer 126 goes into scan mode again and scans another object. If the message is devoid of any additional instructions, the message ends.

Figure 4:
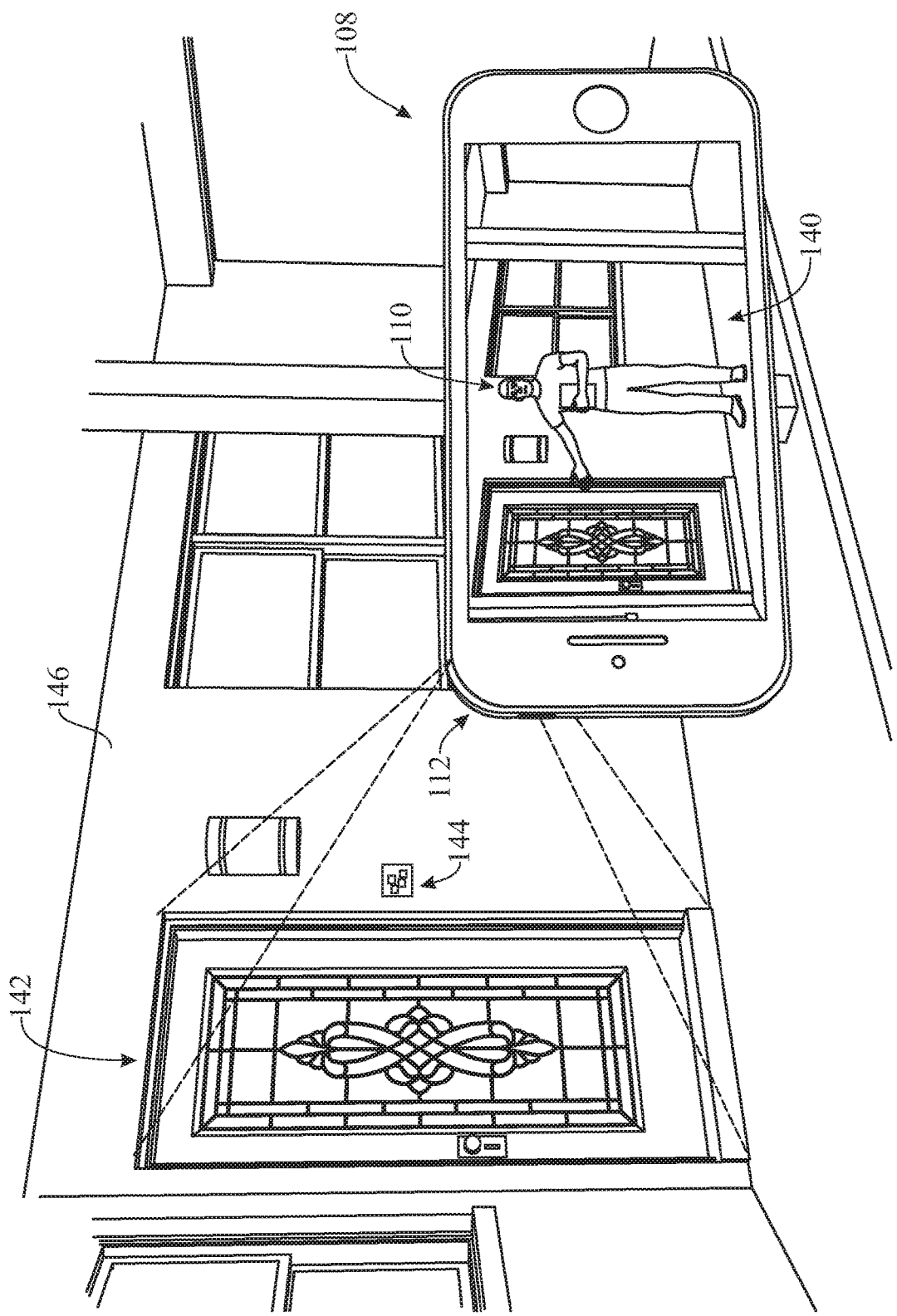
FIG. 4 presents a perspective view of a user using an electronic device to scan an object to access the recorded digital media content stored in the object identifier database and playing the superimposable digital media content on the user's electronic device in accordance with the present invention.

With reference now to FIGS. 4-7, and in particular FIG. 4, a user 110, in another exemplary implementation of the present invention, may create a video message of a virtual tour of a for-sale-house as seen in image 140. For instance, the user 110 may use the embedded camera 112 on the electronic device 110 to access the digital platform application, Mediar, and access record mode. The user 110 can then proceed to scan an object that will be used as the key to access the digital media video that will be connected to the object (as described above). In one exemplary application, the object may comprise the door design that may include intricate and distinguishable features that are identifiable by the system's value assigning subsystem 212. Alternatively, the user 110 may attach or otherwise make available a scannable object 144, such as an NFC chip sticker. QRC code, or business card. In the present example, the user attached a card (or a series of identical cards) on the door with instructions on how to access the virtual message. Upon the successful scan of the object 144 and assignment of value, the user 110 records (or uploads a pre-recorded) message that will be connected to the scanned object 144. The message may include, but not be limited to, the user 110, or in this example, the realtor, creating a video of himself going through the house and performing a virtual tour pointing out the interior and exterior features of the home 146 to prospective homebuyers.

A prospective buyer (not shown) upon arriving at the home 146, may access the digital message by scanning the object. First, however, the buyer must generally go through the steps outlined above to download or otherwise gain access to the cloud-based system 200 that supports the digital platform 202. The buyer, based on the directives of the user that created the message, accesses the application to access play mode, as denoted in step 130 in FIG. 2, to scan the object that unlocks the hidden protected link connected to the digital message. Based on the above exemplary description, the buyer scans the door 142 of the house 146 to access the message. Alternatively, should the instructions of the user differ, the buyer scans the card 144 left and made available to the buyer visiting the home 146. After scanning the object or door 144, 142, the application may automatically play the digital video message 140 that was linked to the object. In this case, the video may comprise the real estate agent welcoming the prospective buyer to the home and walking the buyer through the home by guiding the buyer through a virtual tour video message that is superimposed on the real-world environment of the buyer when viewed through the electronic device 108. In this instant case, the buyer may see the agent walking through the home (in 3D) pointing out features in the home that may be attractive to the prospective buyer. The message may include additional instructions to scan a subsequent object, as denoted in step 136 in FIG. 2, to access a separate video. For example, the agent may give the prospective buyer the option to scan another object in the video (currently playing), if the buyer was interested in hearing and watching a video about a particular feature of the house, say a historical fireplace or the origins of the floors and its significance or value to the home. Other examples of alternative videos may include when the kitchen was last remodeled, or when the roof was repaired or changed. One will appreciate that the aforementioned examples are to be considered exemplary and not limiting in any form.

Figure 5:
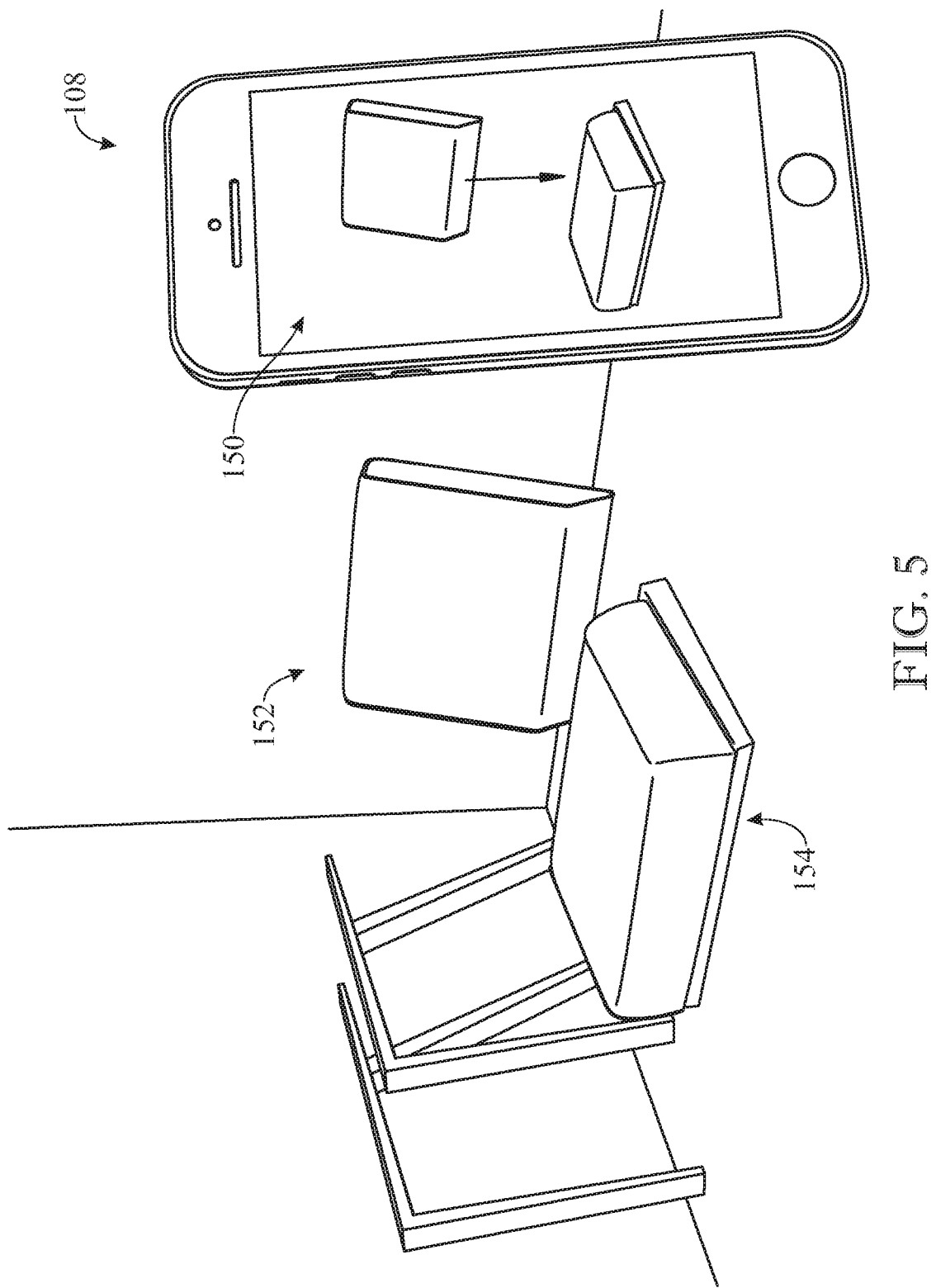
FIG. 5 presents a perspective view of another exemplary embodiment where a user using an electronic device scans an object to access a digital video that is separated into at least two parts.
Figure 6:
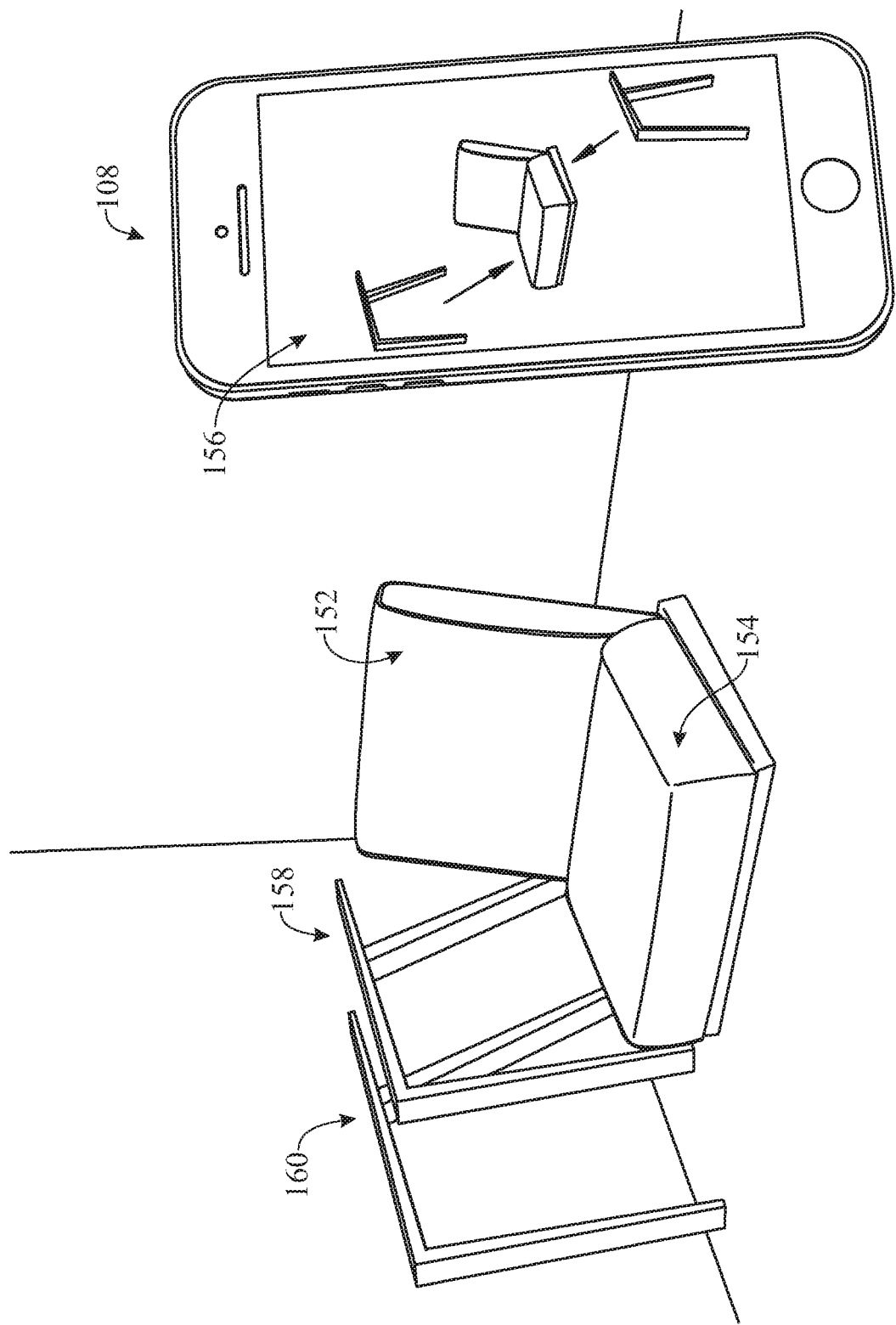
FIG. 6 presents a perspective view a the second portion of the video shown in FIG. 4, wherein the user scans at least one other object to play the second portion of the video.

Turning now to FIGS. 5 and 6, there is illustrated another example of how the present system 100 may be utilized. As illustrated, a user or a manufacturer with access to an electronic device 108 may decide to create a digital message video that details how to build something they sell to consumers in parts. For instance, in the illustrated example, the user created (or uploaded) a video message that shows another user how to build or put together various already built pieces to form a chair. The instructional video may be spliced into several videos that concentrate on separate facets of the build. For instance, FIG. 5 illustrates a three-dimensional, superimposable, video message of a first assembly process 150 that outlines how to piece A 152, and piece B 154 together. As described herein above, the object that triggers can be a multiple of things and thus, further explanation on the object trigger is not done in this exemplary embodiment. The video message of the first assembly process 150 may include instructions for a secondary object to be scanned to activate a secondary video message of a second assembly process 156, as shown in FIG. 6. The second assembly process 156 video message may also include a three-dimensional, superimposable, video message that instructs a user how to put assemble piece C 158, piece D 160 with already assembled pieces A and B 152, 154. One will appreciate that additional videos may be made to further assemble additional parts of the object being assembled in FIGS. 5 and 6 and thus, the foregoing description should be considered exemplary and not limiting in any form.

Figure 7:
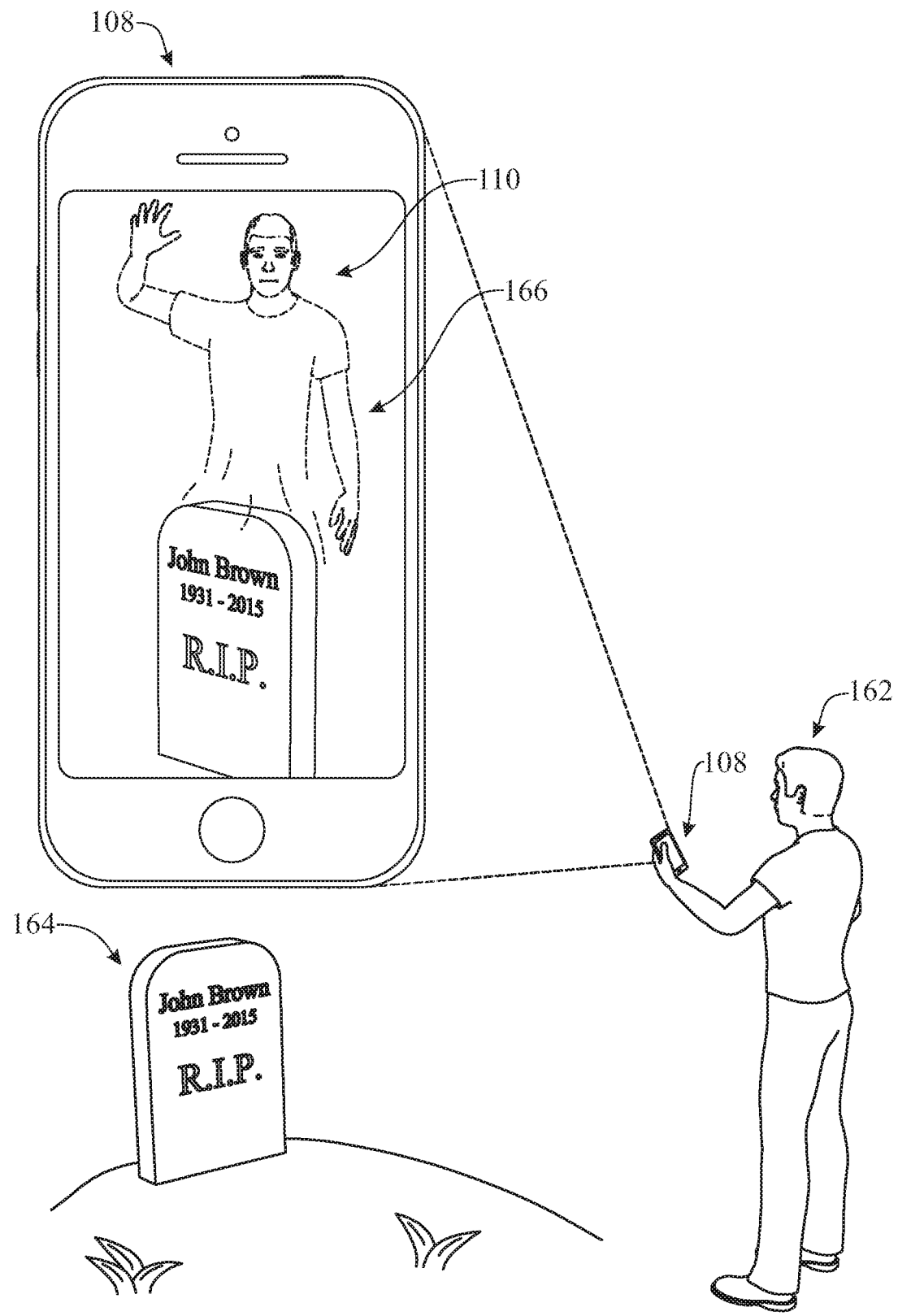
FIG. 7 presents a perspective view of pre-recorded image or video message of a deceased person that plays when a user using the present system scans the selected object (i.e., tombstone) to play the superimposable message on a real-world environment when viewing the digital video/image through the display of the electronic device.

Referring now to FIG. 7, illustrating another non-limiting example of how the system 100 may be utilized by a user to send a digital message to another person. As illustrated, a user 110, who may be terminally ill, has a condition, or is prepared for an unforeseen circumstance, such as an untimely demise, can use the present system to create a digital message that is left behind for another person 162, such as a loved one. The user 110, in this example, can use the digital platform to create a video message or image and connect the digital message to a memorable object that will outlast the user 110 and will be carefully looked after. For instance, the object used to deliver this type of message could be an urn or a tombstone 164, as illustrated in FIG. 7. In the event as immediately described above, the user 110 may record a digital message 166 to remind the person 162 of how much the user 110 loved him/her, or how valuable, or even how much they meant to the user 110. One will appreciate that there is no limit to the topic or content that the user can provide in the digital message when crafting the message and thus, the foregoing example is to be considered exemplary and not limiting.

Continuing with FIGS. 1 and 7 the person 162 can then using the application, Mediar, supported by the digital platform that is part of the cloud service system 200 (FIG. 1), to access the digital message by scanning the object, or this exemplary case the tombstone 164 (FIG. 7). The person 162 will then be able to view a three-dimensional image or video superimposed on the person's real world environment of the deceased user 110 delivering the message to the person 162. This example would make a thoughtful parting gift for a person who is ill, or knows their time is short but would like to leave a message or a number of messages to one or more people after the person is gone.

In summary, the present invention provides a unique experience to a user to send digital media messages to another user electronically but through a tangible, liftable object that can be kept as a gift, both symbolizing and actually being the key to the digital message. As described above, the message may comprise superimposable images and/or videos on a real-world environment when seen through the display of one or more electronic devices, giving the user watching the video a unique and one of a kind experience.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. An augmented reality system for creating superimposable digital media content messages viewable on electronic devices, comprising:
   a digital platform stored in a computer-readable memory and executed by at least one processor on at least one server in electrical communication with an object identifier database, a digital media content database, a link creating subsystem, a value assigning subsystem, and a value identifier subsystem, allowing the augmented reality system to:
   receive a first user's request to access an embedded electronic camera on an electronic device to capture a digital image of an object having at least one object feature;
   assign at least one value to the object feature of the object captured in the digital image;
   create a protected link that is only accessible via a key and embed the protected link in the digital image, wherein the protected link is a hidden link;
   store the digital image of the object with the embedded protected link in the object identifier database;
   process the first user's request to store digital content in the digital media content database and connect the digital content to the protected link in the digital image so that the digital content is accessible through the protected link;

receive a second user's request to scan the object with an embedded electronic camera on an electronic device;
process a scanned digital image of the object stored in memory taken by the second user,
wherein an identifier value subsystem determines whether a value match exists in the object identifier database;
if the matched value is found, access the link embedded in the digital image having the key give access to the digital content connected to the protected link; and
show on a display of the electronic device of the second user the digital content.

2. The augment reality system of claim 1, wherein the digital media content comprises at least one digital image.

3. The augment reality system of claim 1, wherein the digital media content comprises at least one digital video.

4. The augment reality system of claim 1, wherein the value identifier subsystem assigns the value to the object feature of the object captured in the digital image.

5. The augment reality system of claim 1, wherein the key to access the protected link is the value.

6. The augmented reality system of claim 1, wherein the value assigning subsystem assigns a plurality of values to a plurality of features of a single object.

7. The augmented reality system of claim 1, wherein the object feature of the object is the object's geometric shape.

8. The augmented reality system of claim 1, wherein the object feature of the object is a scannable code.

9. The augmented reality system of claim 1, wherein the object feature of the object is an NFC sticker.

10. The augmented reality system of claim 1, wherein the digital media content comprises digital media that is superimposable on a real-world environment when seen through the display of the electronic device.

11. The augmented reality system of claim 10, wherein the digital media comprises at least one three-dimensional digital video or at least one three-dimensional digital image.

12. The augmented reality system of claim 2, wherein the least one digital image comprises a three-dimensional image of at least one person that is superimposable on a real-world environment when viewing the digital image through the display of the electronic device.

13. The augmented reality system of claim 3, wherein the least one digital video comprises a three-dimensional video that is superimposable on a real-world environment when viewing the digital video through the display of the electronic device.

14. An augmented reality system for creating superimposable digital media content messages viewable on electronic devices, comprising:
a liftable object having at least one object feature; and
a digital platform stored in a computer-readable memory and executed by at least one processor on at least one server in electrical communication with an object identifier database, a digital media content database, a link creating subsystem, a value assigning subsystem, and a value identifier subsystem, allowing the augmented reality system to:
receive a first user's request to access an embedded electronic camera on an electronic device to capture a digital image of the liftable object;
assign at least one value to the object feature of the object captured in the digital image,
wherein the value identifier subsystem assigns the value to the object feature of the object captured in the digital image;
create a protected link that is only accessible via a key and embed the protected link in the digital image,
wherein the protected link is a hidden link and the protected link is created and assigned by the link creating subsystem;
store the digital image of the object with the embedded protected link in the object identifier database;
process the first user's request to store digital video message in the digital media content database and connect the digital video message to the protected link in the digital image so that the digital video message is accessible through the protected link;
receive a second user's request to scan the liftable object with an embedded electronic camera on an electronic device;
process a scanned digital image of the liftable object stored in memory taken by the second user and compare the scanned digital image to a plurality of images of objects that are stored in the object identifier database,
wherein an identifier value subsystem determines whether a value of the object in the scanned digital image matches the value of any one of the objects in the plurality of digital images stored in the object identifier database to determine if a matched value is found;
if the matched value is found, access the link embedded in the digital image having the matched value to gain access to the digital video message connected to the protected link; and
automatically play on a display of the electronic device of the second user the digital video message.

15. The augmented reality system of claim 14, wherein the object feature of the object is a scannable code.

16. The augmented reality system of claim 14, wherein the object feature of the object is an NFC sticker.

17. The augmented reality system of claim 14, wherein the object feature of the object is the object's geometric shape.

18. The augmented reality system of claim 14, wherein the digital video message comprises a three-dimensional video that is superimposable on a real-world environment when viewing the digital video message through the display of the electronic device.

19. The augmented reality system of claim 14, wherein the key to access the protected link is the value.

20. An augmented reality system for creating superimposable digital media content messages viewable on electronic devices, comprising:
a digital platform stored in a computer-readable memory and executed by at least one processor on at least one server in electrical communication with an object identifier database, a digital media content database, a link creating subsystem, a value assigning subsystem, and a value identifier subsystem, allowing the augmented reality system to:
receive a first user's request to download the digital platform in the form of an application on to an electronic device;
receive a first user's request to access an embedded electronic camera on the electronic device to capture a digital image of a liftable object having at least one object feature;
assign at least one value to the object feature of the object captured in the digital image, wherein the value identifier subsystem assigns the value to the object feature of the object captured in the digital image, and wherein the object feature of the object comprises any one of a scannable code, and an NFC sticker;

create a protected link that is only accessible via a key and embed the protected link in the digital image, wherein the protected link is a hidden link and the protected link is created and assigned by the link creating subsystem, and wherein the key to access the protected link is the value;

store the digital image of the object with the embedded protected link in the object identifier database;

process the first user's request to store digital video message in the digital media content database and connect the digital video message to the protected link in the digital image so that the digital video message is accessible through the protected link;

receive a second user's request to scan the liftable object with an embedded electronic camera on an electronic device;

process a scanned digital image of the liftable object stored in memory taken by the second user and compare the scanned digital image to a plurality of images of objects that are stored in the object identifier database, wherein an identifier value subsystem determines whether a value of the object in the scanned digital image matches the value of any one of the objects in the plurality of digital images stored in the object identifier database to determine if a matched value is found;

if the matched value is found, access the link embedded in the digital image having the matched value to gain access to the digital video message connected to the protected link; and automatically play on a display of the electronic device of the second user the digital video message, wherein the digital video message comprises a three-dimensional video that is superimposable on a real-world environment when viewing the digital video message through the display of the electronic device of the second user.

\* \* \* \* \*